(12) United States Patent
Gretz

(10) Patent No.: US 7,402,748 B1
(45) Date of Patent: Jul. 22, 2008

(54) REVERSIBLE ELECTRICAL BOX FOR RESIDENTIAL AND COMMERCIAL CEILING CONSTRUCTION

(76) Inventor: Thomas J. Gretz, 1102 Oakmont Rd., Clarks Summit, PA (US) 18411

( * ) Notice: Subject to any disclaimer, the term of this patent is extended or adjusted under 35 U.S.C. 154(b) by 57 days.

(21) Appl. No.: 11/511,657

(22) Filed: Aug. 29, 2006

(51) Int. Cl.
*H02G 3/08* (2006.01)

(52) U.S. Cl. ............................. 174/58; 174/50; 174/53; 174/60; 248/906; 439/535; 33/528

(58) Field of Classification Search .................... 174/53, 174/58, 50, 63, 66, 67; 248/906; 439/535; 220/3.7, 3.8, 4.02, 241, 242; 33/528
See application file for complete search history.

(56) References Cited

U.S. PATENT DOCUMENTS

| | | | |
|---|---|---|---|
| 4,053,082 A | 10/1977 | Ullman | |
| 5,600,093 A | 2/1997 | Herth et al. | |
| 5,824,952 A | 10/1998 | Bordwell et al. | |
| 5,988,421 A | 11/1999 | Jorgensen | |
| 6,005,190 A * | 12/1999 | Stark et al. | 174/66 |
| 7,053,301 B2 | 5/2006 | Johnson | |
| 7,151,218 B2 * | 12/2006 | Dinh | 174/58 |

* cited by examiner

*Primary Examiner*—Dhiru R Patel

(57) ABSTRACT

A reversible electrical box assembly for mounting an electrical fixture on a ceiling. The electrical box assembly includes a hollow body having a sidewall. The sidewall includes two ends and a center. A flange extends outwards from the sidewall at a location offset from the center thereby dividing the sidewall into a long and short sidewall. A panel is provided for closing either of the ends of the hollow body. The panel can be secured to either the long sidewall or to the short sidewall to create an opposing sidewall of an appropriate length for extending through the ceiling covering at the job site.

7 Claims, 6 Drawing Sheets

REVERSIBLE ELECTRICAL BOX FOR RESIDENTIAL AND COMMERCIAL CEILING CONSTRUCTION

FIELD OF THE INVENTION

This invention relates to electrical boxes for mounting light fixtures or other electrical devices to a ceiling.

BACKGROUND OF THE INVENTION

Building codes typically call for thicker ceilings in residential construction versus commercial construction. Ceilings in residential buildings typically include one half-inch thickness of drywall whereas commercial buildings typically include two ⅝-inch thicknesses of drywall. Conventional ceiling boxes, which are commonly used for mounting light fixtures or other electrical devices to an overhead surface, typically include a sidewall of a fixed length to accommodate a specified thickness of drywall. When mounted to an overhead support, the fixed length sidewall positions the lower edge of the electrical box roughly even with the lower surface of the drywall, at which level it will be in position to accept the connection of an electrical device thereto.

Unfortunately, as a result of having a fixed length sidewall, a supplier must stock at least two sizes of ceiling box to accommodate both residential and commercial construction requirements. Stocking more than one version of ceiling box therefore decreases inventory space and increases inventory-carrying costs.

What is needed is a ceiling electrical box that can be used for both residential and commercial construction, thereby reduced stocking requirements and providing installers with a more versatile box for satisfying both residential and commercial building needs.

SUMMARY OF THE INVENTION

The invention is a reversible electrical box assembly for mounting an electrical fixture on a ceiling. The electrical box assembly includes a hollow body having a sidewall. The sidewall includes two ends and a center. A flange extends outwards from the sidewall at a location offset from the center thereby dividing the sidewall into a long and short sidewall. The electrical box assembly includes a panel for closing either of the ends of the hollow body. An installer can secure the panel to either the long sidewall or the short sidewall to create an opposing sidewall of an appropriate length for extending through the ceiling covering at the job site.

OBJECTS AND ADVANTAGES

Several advantages are achieved with the electrical box assembly of the present invention, including:

(1) One electrical box assembly is capable of providing an electrical box for both residential and commercial ceiling.
(2) The electrical box assembly reduces stocking requirements for ceiling electrical boxes. For conventional ceiling boxes, separate boxes must be stocked for residential versus commercial applications.
(3) The electrical box assembly can be easily configured in the field for either residential or commercial construction.
(4) The electrical box assembly can be flipped 180 degrees to accommodate either commercial or residential ceiling applications.
(5) The electrical box assembly can accommodate any conventional light fixture and bracket.
(6) The electrical box assembly includes two parts that can each be molded of plastic to reduce production costs.

These and other objects and advantages of the present invention will be better understood by reading the following description along with reference to the drawings.

Figure 1:
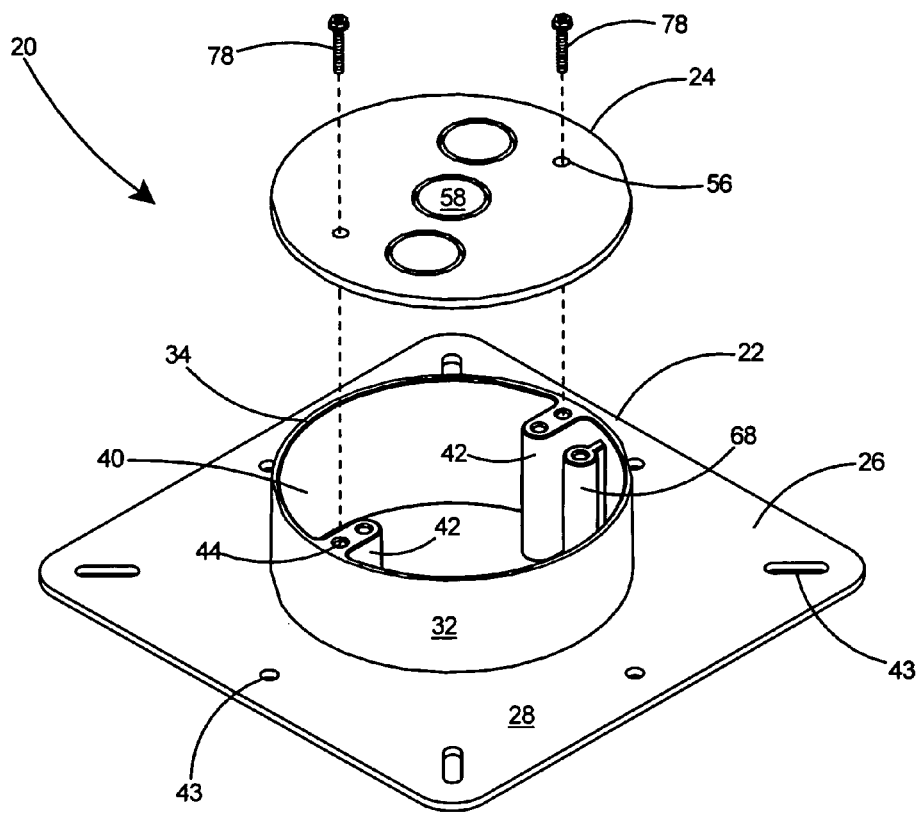
FIG. 1 is a perspective view of an electrical box assembly according to the present invention.

| INDEX TO REFERENCE NUMERALS IN DRAWINGS | |
|---|---|
| 20 | electrical box assembly |
| 22 | hollow body |
| 24 | panel |
| 26 | flange |
| 28 | first side of flange |
| 30 | second side of flange |
| 32 | first or short sidewall |
| 34 | first end |
| 36 | second or long sidewall |
| 38 | second end |
| 40 | interior cavity |
| 42 | boss |
| 43 | aperture in flange |
| 44 | first bore |
| 45 | flat sealing surface |
| 46 | second bore |
| 48 | center portion of boss |
| 50 | outer periphery of panel |
| 52 | inner surface of panel |
| 54 | outer surface of panel |
| 56 | aperture in panel |
| 58 | knockout portion |
| 60 | planar surface of sidewall |
| 62 | planar surface of panel |
| 64A, 64B | ends of boss |
| 66 | face of boss |
| 68 | grounding boss |
| 70 | end of grounding boss |
| 72 | bore |

-continued

INDEX TO REFERENCE NUMERALS IN DRAWINGS

| 74 | center of hollow body |
| --- | --- |
| 76 | drywall |
| 78 | fastener |
| 80 | electrical box |
| 82 | overhead support |
| 84 | fastener |
| 86 | sealing material |
| 88 | ceiling |
| 90 | drywall |
| 92 | electrical box |
| L1 | distance the short sidewall extends from the flange |
| L2 | distance the long sidewall extends from the flange |
| W | width or diameter of short and long sidewalls |

DETAILED DESCRIPTION OF THE INVENTION

Figure 4:
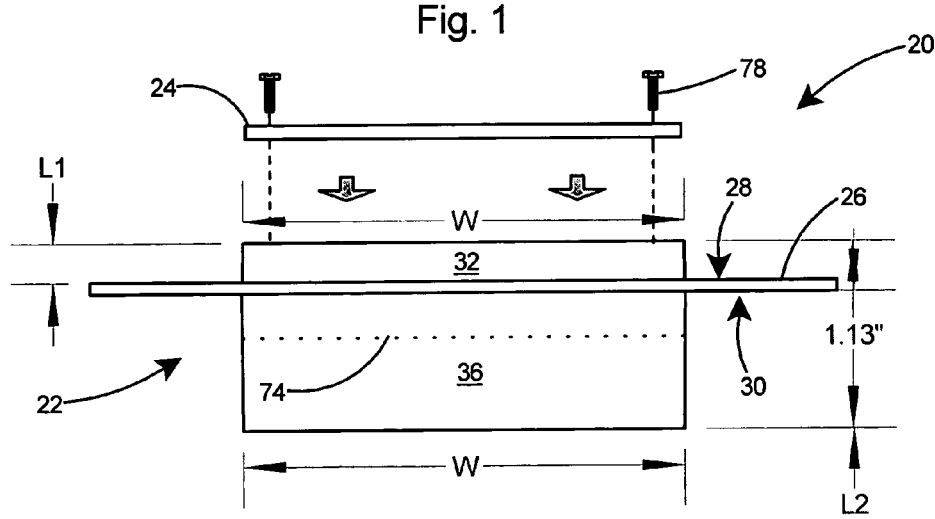
FIG. 4 is a side view of the electrical box assembly of FIG. 1.
Figure 9:
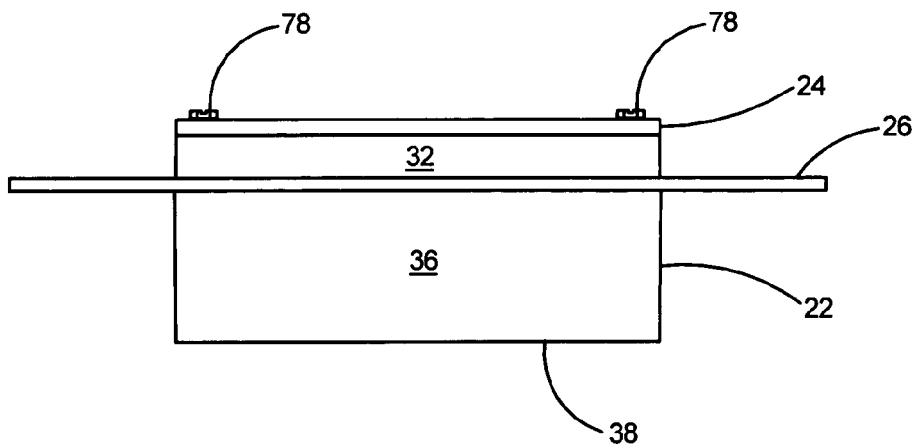
FIG. 9 is a side view similar to FIG. 8 but with the panel secured to the hollow body to form an electrical box according to the present invention.

With reference to FIGS. 1 and 4 there is shown a preferred embodiment of the present invention, an electrical box assembly 20 including a hollow body 22 and a panel 24. An integral flange 26 extending outwards from the hollow body 22 and includes a first side 28 and a second side 30. The hollow body 22 includes a first or short sidewall 32 extending from the first side 28 of the flange 26 and terminating in a first end 34 and a second or long sidewall 36 extending from the second side 30 of the flange 26 and terminating in a second end 38. The panel 24 can be used for selectively closing one of the ends 34, 38 of the hollow body 22 thereby forming an electrical box (see FIG. 9) with an interior cavity 40 for receipt of an electrical fixture or device (not shown) therein. As shown in FIG. 4, the first sidewall 32 and the second sidewall 36 extend from the flange 26 by different amounts (see L1 and L2).

Figure 2:
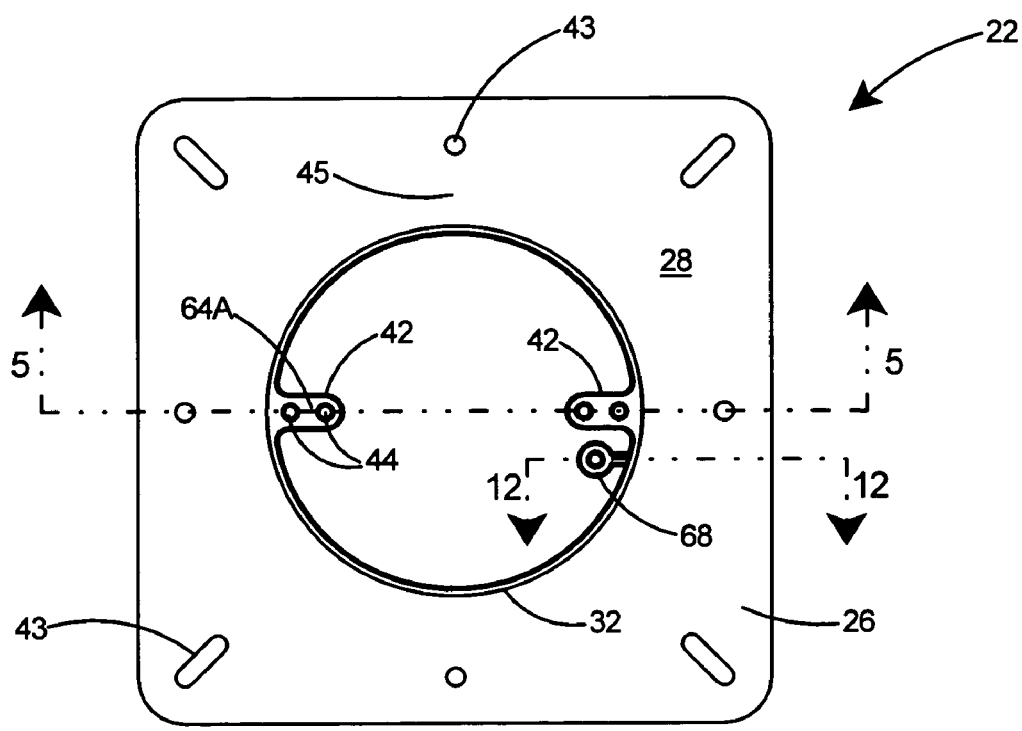
FIG. 2 is a top view of a hollow body that forms a portion of the electrical box assembly of FIG. 1.
Figure 3:
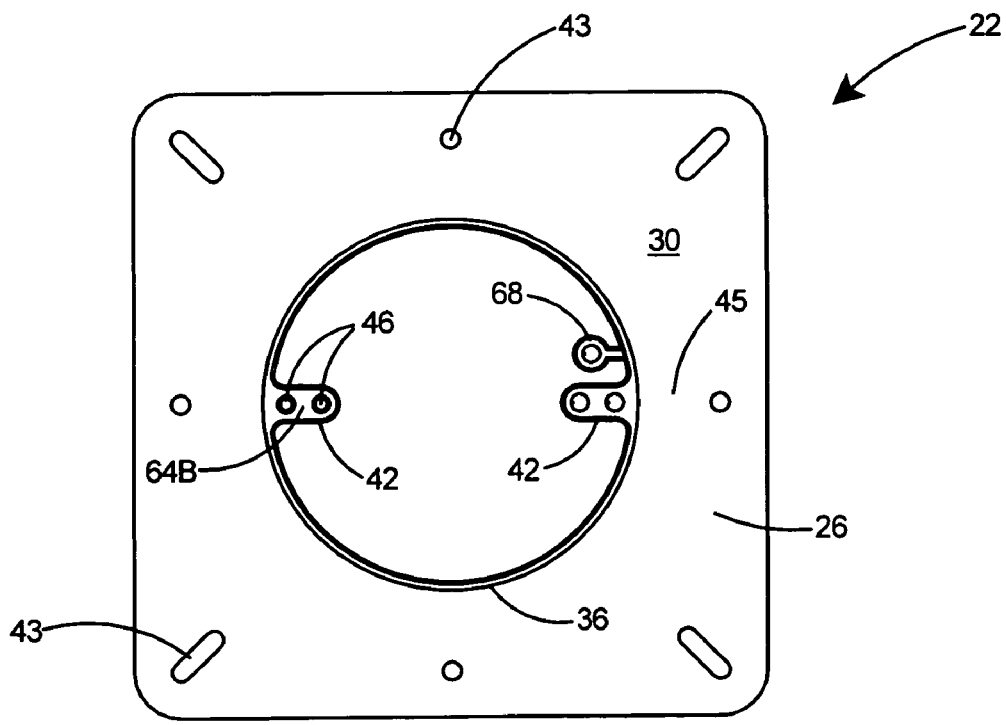
FIG. 3 is a bottom view of the hollow body of FIG. 2.

Referring to FIGS. 2 and 3, one or more bosses 42 are integral with the hollow body 22. The bosses 42 include bores 44 and 46 therein for acceptance of fasteners therein (not shown). The flange 26 includes apertures 43 therein, with the apertures the apertures 43 capable of later accepting fasteners (not shown) for mounting the flange 26 to an overhead structure. The first 28 and second 30 sides of the flange 26 further include a flat sealing surface 45 inside the apertures 43, or between the apertures 43 and the sidewalls 32 and 36 on each respective side of the flange 26. The flat sealing surfaces 45 are capable of later accepting electrical sealing materials thereon for providing a moisture-tight seal between the flange 26 and a surface (not shown) that it is secured to.

Figure 5:
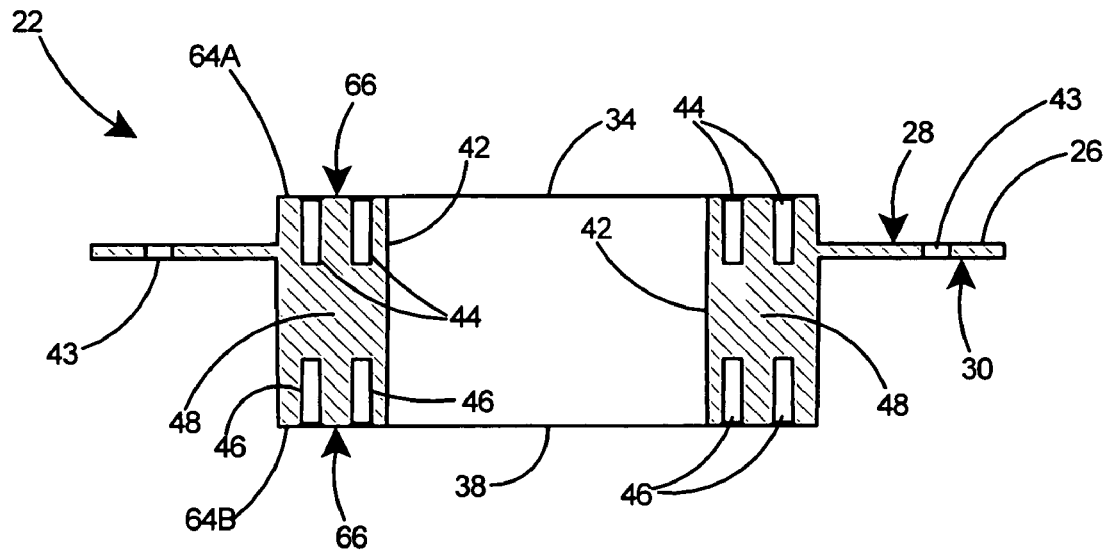
FIG. 5 is a sectional view of the hollow body taken along lines 5-5 of FIG. 2.

With reference to FIG. 5, the bosses 42 include one or more first bores 44 oriented toward the first end 34 of the hollow body 22 and one or more second bores 46 oriented toward the second end 38 of the hollow body 22. Each of the first bores 44 is coaxial with a corresponding second bore 46 and the bosses 42 include a center portion 48 separating the first 44 and second 46 bores. The first bore 44 and second bore 46 in each boss are directed 180 degrees apart, thereby forming two-way bosses 42 that are integral with the hollow body 22 and capable of receiving a fastener from either end 34, 38 of the hollow body. Each boss 42 includes two pairs of bores 44, 46 facing in each direction.

Figure 6:
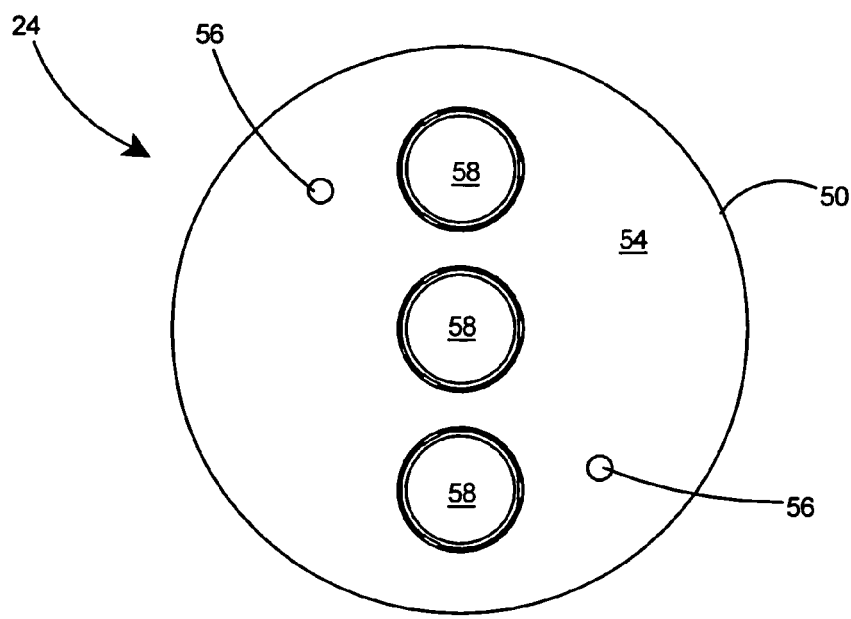
FIG. 6 is a plan view of a panel that forms a portion of the electrical box assembly of FIG. 1.
Figure 7:
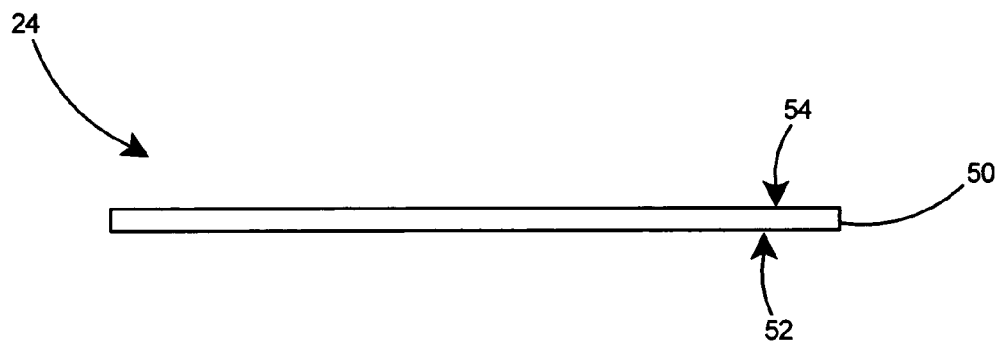
FIG. 7 is a side view of the panel of FIG. 6.

Referring to FIGS. 6 and 7, the panel 24 includes an outer periphery 50, an inner 52 and outer 54 surface, one or more apertures 56, and one or more knockout portions 58. The knockout portions 58 are capable of later being removed for providing a passage for electrical cable (not shown) therethrough.

Figure 8:
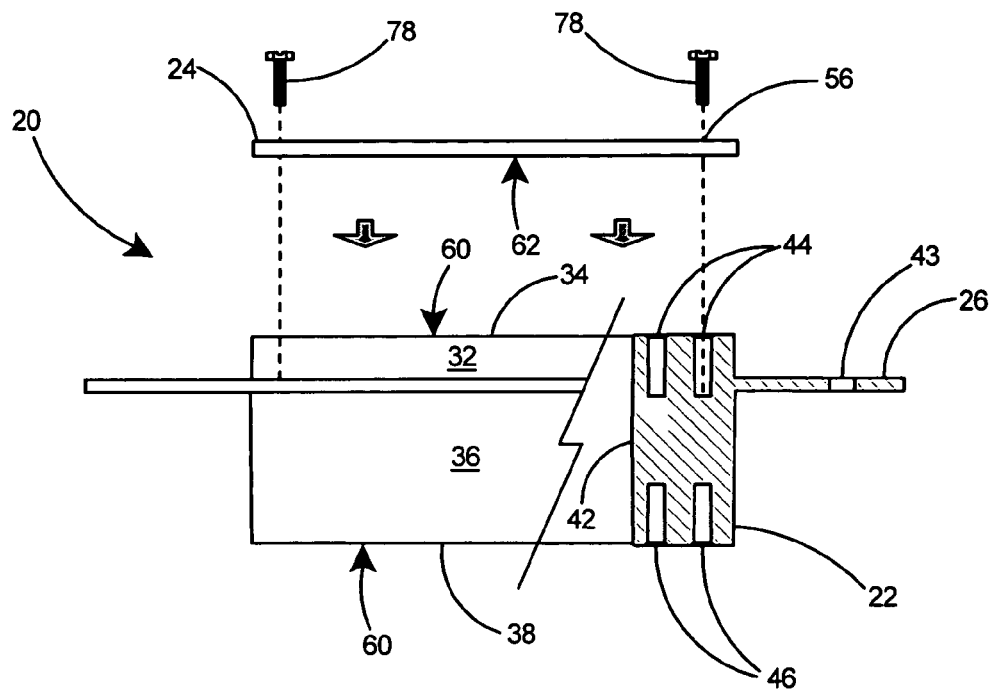
FIG. 8 is a side view of the electrical box assembly of the present invention with the right side of the hollow body broken away and the panel exploded away from the hollow body and in position to be secured thereto to form an electrical box according to the present invention.

As shown in FIG. 8, the apertures 56 in the panel 24 can be aligned coaxially with the first bores 44 when the panel 24 is in alignment with the first or short sidewall 32. Securing the panel 24 to the short sidewall 32 with fasteners 78 creates an opposing long sidewall 36 to which an electrical fixture (not shown) can be mounted. Conversely, the panel 24 can be secured to the long sidewall 36 to create an opposing short sidewall 32. The apertures 56 in the panel 24 are aligned coaxially with the first bores 44 when securing the panel 24 to the short sidewall 32 or are aligned coaxially with the second bores 46 when the panel 24 is in aligned with the second sidewall 36.

The first end 34 of the first sidewall 32 and the second end 38 of the second sidewall 36 both include planar surfaces 60. The inner surface 52 of the panel 24 also includes a planar surface 62. When the panel 24 is secured to one of the sidewalls 32, 36 of the hollow body 22, the planar surface 62 of the panel 24 seals against the planar surface 60 of the sidewalls when fastened thereto.

With reference to FIG. 4, the first 32 and second 36 sidewalls, which extend respectively from the first 28 and second 30 sides of the flange 26, are of equal width (see W) or diameter and are coaxial with one another. Preferably, the first sidewall 32 extends from the first side 28 of the flange 26 by between 0.4 and 0.6 inch (see L1) and the second sidewall 36 extends from the second side 30 of the flange 26 by between 1.15 and 1.35 inches (see L2). Most preferably, the first sidewall 32 extends from the first side 28 of the flange 26 by 0.5 inch and the second sidewall 36 extends from the second side 30 of the flange 26 by 1.25 inches.

Referring to FIG. 5, the bosses 42 include two opposed ends 64A and 64B and a face 66 on each of the ends 64A, 64B. The faces 66 of the bosses 42 are coplanar with the surfaces of the first 32 and second 36 sidewalls.

Figure 12:
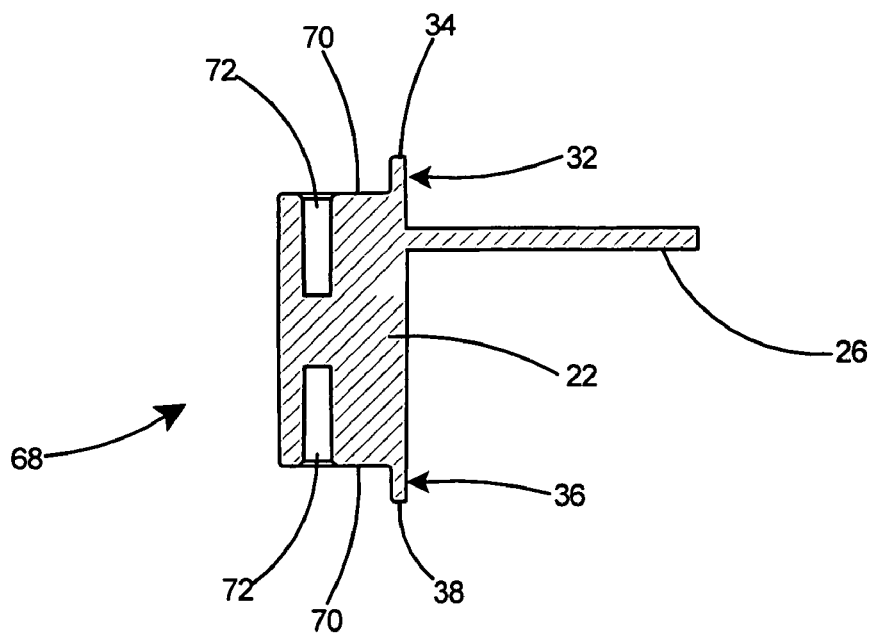
FIG. 12 is a sectional view of the hollow body taken along lines 12-12 of FIG. 2.

As shown in FIG. 12, the electrical box assembly also includes a grounding boss 68 integral with the sidewalls 32, 36 of the hollow body 22. The grounding boss 68 includes two ends 70 and a bore 72 in each of the ends. The ends 70 of the grounding boss 68 are offset from the ends 34, 38 of the sidewalls 32, 36 of the hollow body) 22. The hollow body 22 is capable of accepting a grounding screw (not shown) therein on either of the ends 70 of the grounding boss 68.

With reference to FIG. 4, the hollow body 22 includes two ends 34 and 38 and a center 74. The flange 26 extends outwards from the hollow body 22 at a location offset from the center 74 and divides the hollow body 22 into a long sidewall 36 and a short sidewall 32. The panel 24 is provided for selectively closing, depending on the application the electrical box assembly 20 will be used in, one of the ends 34, 38 of the hollow body 22.

Figure 10:
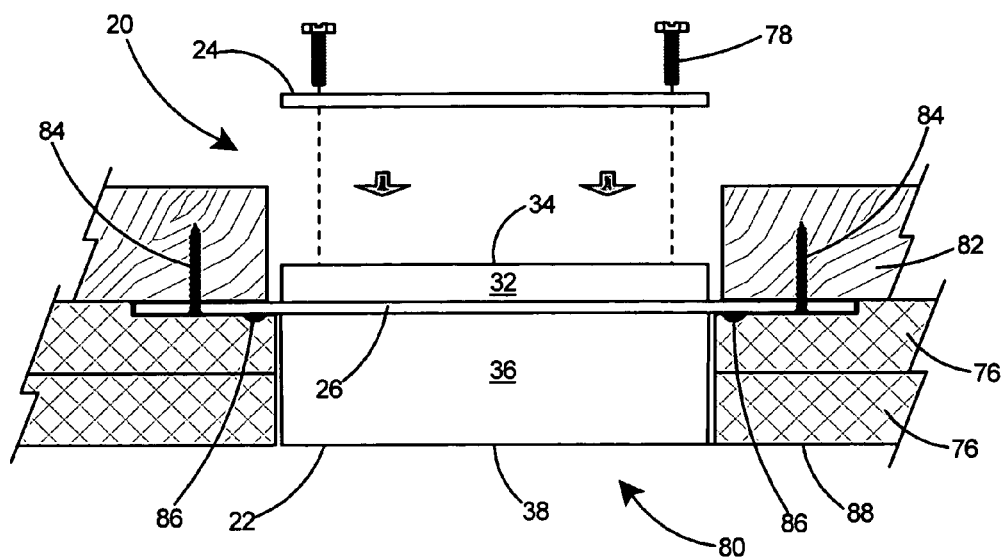
FIG. 10 is a side view of the electrical box assembly of the present invention configured for use on a ceiling in commercial building construction.
Figure 11:
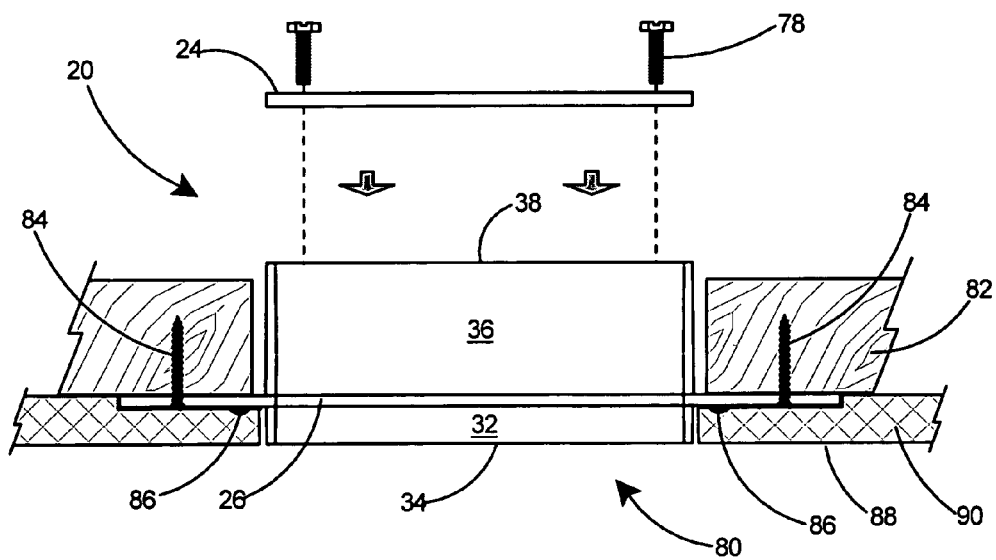
FIG. 11 is a side view of the electrical box assembly of the present invention configured for use on a ceiling in residential building construction.

Reference is made to FIGS. 10 and 11 for an understanding of the operation of the present invention. The electrical box assembly 20 of the present invention meets the needs of electrical installers in both commercial and residential buildings. FIG. 10 depicts the electrical box assembly 20 installed on the ceiling of a commercial building. Commercial construction typically consists of two ⅝-inch thick layers of drywall 76. For a commercial application, an installer would first secure the panel 24 to the short sidewall 32 of the hollow body 22 with fasteners 78. The resultant electrical box 80 is then placed against an overhead support 82 and secured thereto with fasteners 84 driven through flange 26. A bead of sealing material 86, such as duct seal, may then be applied to the flange 26 outwards of the outer periphery of the long sidewall 36. Two layers of drywall 76 are then installed on the ceiling around the electrical box 80. With the long sidewall 36 oriented downwards as shown in FIG. 10, the end 38 of the long sidewall 36 is positioned level with the ceiling 88. It is preferable that the lower edge of a ceiling box be level or slightly higher than the surrounding ceiling so that there are no gaps between the ceiling and any electrical fixture (not shown) later secured thereto.

FIG. 11 depicts the electrical box assembly 20 installed on the ceiling of a residential building. Residential construction typically consists of one ½-inch thick layer of drywall 90. For a residential application, an installer would first secure the panel 24 to the long sidewall 36 of the hollow body 22 with fasteners 78. The resultant electrical box 92 is then placed against the overhead support 82 and secured thereto. A bead of sealing material 86 may then be applied to the flange 26 outwards of the outer periphery of the short sidewall 32. The layer of drywall 90 is then installed on the ceiling around the electrical box 92. With the short sidewall 32 oriented downwards as shown in FIG. 11, the end 34 of the short sidewall 32 is positioned level with the ceiling 88.

The reversible electrical box of the present invention therefore accommodates both residential and commercial ceilings by simply flipping the hollow body 180 degrees and securing the panel to the proper end of the hollow body to form the desired electrical box. The panel and hollow body of the present invention are preferably each molded in one-piece of plastic. The panel and hollow body can be molded of polycarbonate, polyvinylchloride, or similar plastics.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A reversible electrical box assembly comprising:
   a reversible hollow body;
   a flange extending outwards from said hollow body, said flange including a first and second side;
   said hollow body including a first sidewall extending from said first side of said flange and terminating in a first end;
   said hollow body including a second sidewall extending from said second side of said flange and terminating in a second end;
   a panel for closing one of said ends of said hollow body thereby forming within said sidewalls and said panel an electrical box with an interior cavity for receipt of an electrical device therein within said interior cavity;
   said panel on said closed end forming the back wall of said electrical box;
   bosses extending from said sidewalls of said hollow body, said bosses including first bores on said first end of said hollow body and second bores on said second end of said hollow body;
   apertures in said panel for receipt of fasteners for engaging said bosses of said hollow body and thereby fastening said panel securely to said hollow body; and
   one or more knockout portions in said panel, said knockout portions capable of being removed from said panel for providing a passageway through said panel for electrical cable into said interior cavity.

2. The reversible electrical box assembly of claim 1 wherein said first sidewall and said second sidewall extend from said flange by different amounts.

3. The reversible electrical box assembly of claim 1 including
   apertures in said flange; and
   said apertures in said flange capable of accepting fasteners for mounting said flange to an overhead structure.

4. The reversible electrical box assembly of claim 3 wherein
   said first and second sidewalls include an outer periphery;
   said first and second sides of said flange include a substantial amount of flat surface inside said apertures in said flange;
   said flat surface extending entirely around said outer periphery of said sidewalls; and
   said flat surface capable of accepting electrical sealing materials thereon for providing a moisture-tight seal between said flange and a surface that it is secured to.

5. The reversible electrical box assembly of claim 1 wherein
   said first end of said first sidewall and said second end of said second sidewall include planar surfaces;
   said panel includes a planar surface; and
   said planar surface of said panel seals against said planar surface of said sidewalls when fastened thereto.

6. The reversible electrical box assembly of claim 5 wherein
   said bosses include two opposed ends;
   a face on each of said ends of said bosses; and
   said faces of said bosses coplanar with said surfaces of said first and second sidewalls.

7. The reversible electrical box assembly of claim 1 including
   a grounding boss integral with said sidewalls of said hollow body;
   said grounding boss having two ends and a bore in each of said ends; and
   said ends of said grounding boss are offset from said ends of said sidewalls of said hollow body,
   whereby said hollow body is capable of accepting a grounding screw therein on either of said ends of said grounding boss.

* * * * *